July 7, 1953
P. W. PERRY
2,644,501
CUTTING ELEMENT FOR COMPOSTING MACHINES
OR HAY COMMINUTING MACHINES
Filed May 15, 1951
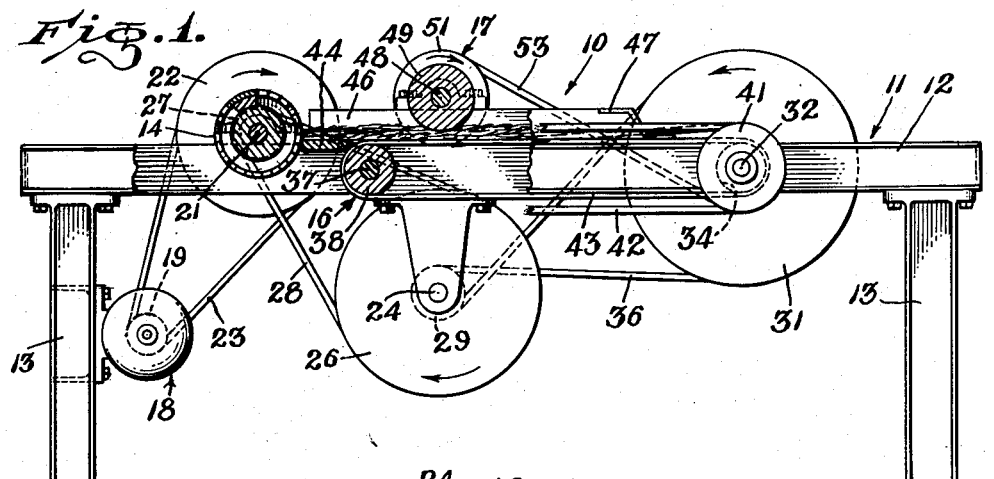
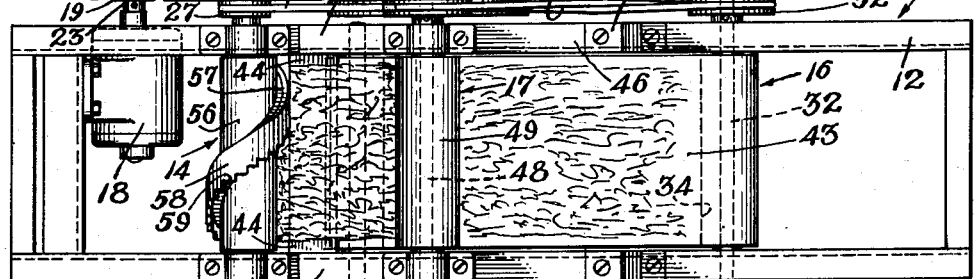
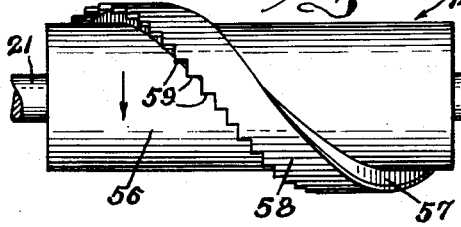
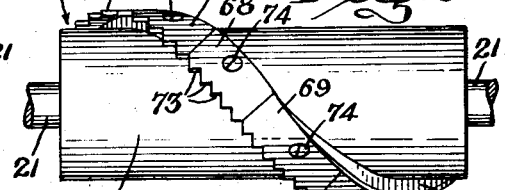
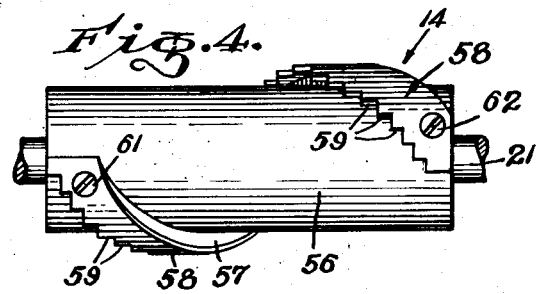
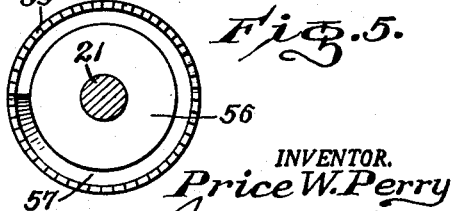
INVENTOR.
Price W. Perry
BY
Attorney Patented July 7, 1953

2,644,501

UNITED STATES PATENT OFFICE 2,644,501

CUTTING ELEMENT FOR COMPOSTING MACHINES OR HAY COMMINUTING MACHINES

Price W. Perry, Encino, Calif.

Application May 15, 1951, Serial No. 226,422

5 Claims. (Cl. 146—119)

This invention relates generally to rotating cutting blades and in particular to an improved rotating cutting blade adapted for use in a composting or hay comminuting machine.

The development of multi-element balanced feed mixtures for fattening livestock, and also meal fowl of all descriptions, has resulted in an increased demand for efficient machinery of various types to grind and cut hays of different categories. There is in public use today a great number of expensive machines which prepare feed mixtures for sale on the market. The small farmer, however, generally cannot afford the large capital investment required for the machinery presently available on the market. If he desires to utilize a balanced feed mixture rather than raw hays to fatten his stock or fowl, he is dependent upon the commercial mixtures now available. This dependency frequently represents a prohibitive operating cost to the small operator. This state of affairs has spurred the large scale development of small farm machinery of all types, both on the farm and commercially. Additionally, expanding electrification of rural areas has made it feasible to develop small electrically driven units capable of handling the small operator's requirements.

In addition to the demand for cutting devices to prepare hays for feed mixtures, there is an increased demand for such devices to prepare hays and grasses of various types for use as compost. It is frequently desirable to introduce nitrogen and other elements into the soil to increase its fertility. An inexpensive source of these elements is found in organic matter in the form of fertilizer, hays and grasses. Hays and grasses may be plowed under the soil to compost the land and are lucrative sources of beneficial soil-enriching elements. As a practical matter the decaying process and the release of desirable elements to the soil is facilitated by physically reducing the organic matter to small size to increase its accessibility to the soil bacteria. The rotating cutting device constructed in accordance with the present invention is especially useful in a conventional compost machine for the purpose of cutting hays, grapevine trimmings, and grasses of various categories for use as fast decaying compost.

It is a prime object of this invention to provide an efficient rotary cutting element for use with small home-made and also commercially made composting machines of simple construction.

It is a further object of this invention to provide a rotating cylinder having a cutting band of improved design characterized in that a constant resistance torque is produced by the load in the machine.

Another object of the invention is the provision of a cutter for a composting machine which functions as its own sizer to fix the length of the cut stems of hay or grass.

These and other more specific objects will appear upon reading the following specification and claims and upon considering in connection therewith the attached drawing.

Referring now to the drawing:

Figure 1 is an elevational view of a conventional composting machine with the frame thereof partially broken away to show a rotary cutting element constructed in accordance with the present invention positioned therein;

Figure 2 is a top view of the composting machine of Figure 1;

Figure 3 is a side view of the rotary cutter constructed in accordance with the present invention and shows the helical cutting element;

Figure 4 is a view of the same cutter rotated through an arc of 180 degrees from its position in Figure 3;

Figure 5 is an end view of the rotary cutter shown in Figures 3 and 4; and

Figure 6 illustrates a second embodiment of the improved cutter in which the serrated helical cutting element is formed in sections for ready removal and replacement.

Referring again to the drawing and to Figures 1 and 2 in particular, a conventional composting machine, indicated generally by the reference character 10, is seen to include a suitable frame formed of a horizontal table 12 mounted on legs 13, a rotary cutter 14, a feed conveyor, indicated generally by reference character 16, to direct hay to the cutting element, a stabilizer or positioner 17 cooperating with the feed conveyor 16 to position the hay in the machine, and a power unit 18 to drive the stabilizer, the conveyor, and the cutting element. A small driving pulley 19 is rigidly affixed to the shaft of driving unit 18, which may be a conventional electric motor. A transverse shaft 21 is rotatably mounted by means of suitable brackets on the table 12 of frame 11 and carries the rotary cutter 14. A large pulley 22 is fixed to shaft 21 outside table 12 and is connected to driving pulley 19 by a belt 23.

A second transverse shaft 24 is mounted rotatably by suitable brackets underneath table top 12 and carries a large idler pulley 26 positioned in line with a small pulley 27 fixed to the end of shaft 21. A continuous belt 28 is positioned in the peripheral grooves of pulleys 26 and 27 and cooperates with them to drive shaft 24 in the same direction as shaft 21 but at reduced speed. A small idler pulley 29 is also mounted on shaft 24 adjacent pulley 26 and is positioned in line with a large pulley 31 mounted on a third transverse shaft 32. Shaft 32 is suitably mounted by brackets to frame top 12 and has a spindle 34 rigidly mounted thereon between the brackets. A crossed belt 36 seats in the grooves of pulleys 29 and 31, as shown in Figure 1. Pulleys 27, 26, 29 and 31 cooperate with belts 28 and 36 to form a double reduction to reduce greatly the speed of shaft 32 from that of shaft 21. Crossed belt 36 in the last reduction element serves to revolve pulley 31 and shaft 32 to which it is fixed in the opposite direction to the rotational direction of shafts 21 and 24.

A fourth transverse shaft 37 is mounted adjacent and parallel to shaft 21 on frame top 12 by means of suitable brackets and has a second spindle 38 positioned between its ends. A small pulley 39 is mounted on shaft 37 outside the brackets and in line with a pulley 41 of the same diameter mounted on shaft 32 and at the side of frame top 12 opposite large pulley 31. A belt 42 connects pulleys 39 and 41 to drive shaft 37, and spindle 38 fixed thereon, at the same speed and in the same direction of rotation as shaft 32 and its spindle 34. A wide endless belt 43 encircles and extends between spindles 34 and 38, which are of the same diameter, and with them forms the feed conveyor 16.

An apron 44 is mounted transversely in the frame top 12 between rotary cutter 14 and the feed conveyor 16. Raw hay or grass is deposited manually on the moving belt 43 and is conveyed to and across apron 44 to rotary cutter 14 and in its travel is positioned on the belt by a stabilizing unit 17. The latter is mounted by pivoted side frame members or arms 46 on the sides of frame top 12 and includes a fifth transverse shaft 48 rotatably mounted in side frame members 46 by suitable brackets and carrying a fixedly attached spindle or roller 49. The arms 46 are pivotally mounted on the frame top 12 by flexible straps 47 in such a manner that a force directed upwardly on the spindle will cause the arms 46 to move upwardly in the direction of the force. A pulley 51 is mounted on the end of shaft 48 directly in line with a pulley 52 of the same diameter on shaft 32 adjacent pulley 31. A crossed belt 53 connects pulleys 51 and 52 and cooperates with them to drive shaft 48 and roller 49 in the direction of rotation opposite that of shaft 32 and the conveyor belt spindle positioned thereon.

The moving surfaces of spindle 49 and belt 43 cooperate to compress and direct the hay or straw forcibly to the rotary cutter 14 to increase the efficiency of the cutter. The force of compression is determined by the weight of the stabilizer opposing pivotal movement about the straps 47.

Referring now to Figures 3, 4 and 5, the rotary cutter 14 constructed in accordance with the present invention is seen to be adapted for use in the composting machine described and includes a cylindrical body 56 mounted on its axially extending driving shaft 21, a helical shoulder or band formed on the surface of said cylinder, and a detachable helical cutting element 58 formed with serrations 59 along its leading edge. Helical shoulder or band 57 extends through an arc of 360 degrees on the surface of cylinder 56. Helical cutting element 58 comprising a band-type blade is mounted on band 57 and spaced by it from cylinder 56 is preferably constructed of spring steel and in its unsprung condition forms a tighter helix than band or ridge 57. In being mounted on ridge 57 the cutting element 58 must be slightly sprung and when released firmly clamps on ridge 57 at all points making a tight fit which prevents straw or hay cuttings from becoming wedged between it and shoulder 57. Blade 58 has screw holes at its opposite ends seating screws 61 and 62 which extend into helical shoulder 57. It is to be noted that one edge of each serration 59 lies parallel to the axis of rotation of the cutter and is tapered to a sharp cutting edge. The serrations may be case hardened, if desired, to maintain the sharpness of the cutting edge. The serrated edge of cutting element 58 projects forwardly of the leading edge of helical ridge 57 so that the cutting edge makes contact with the material being cut.

The requisite direction of rotation of the cutter is indicated in Figures 3 and 4 by arrows.

With the rotary cutter in place in the compost machine above described the sharpened edges of serrations 59 impinge sequentially upon the advancing hay, straw or grass and cut the ends of the individual stalks as they are conveyed to the cutter. Transverse cross member or apron 44 bolted to frame top 12 immediately adjacent spindle 38 has its upper surface in the plane of the carrying surface of conveyor belt 43. With the cutter 14 in place the helical cutting element 58 moves immediately adjacent the apron, the clearance being sufficient to allow the cutter to rotate freely while insuring a cutting, shearing action.

The hay and straw fibers are moved over the top surface of cross member 44 by the movement of conveyor belt 43 until they project beyond the edge of the cross member and into abutting contact with the rotating cylinder 56. The advancing cutting element or blade 58 cuts the fibers along the line of the adjacent edge of cross member 44 so that the cuttings have a length equal to the distance between the surface of cylinder 56 and the edge of the cross member. In general the radial height of the cutting blade 58 above the cylinder 56 is approximately the length of the cuttings.

In use the rotary cutter constructed in accordance with the present invention may become dull or broken by pebbles, stones and hard foreign elements suspended in material fed to it. Under these circumstances removal, repair and sharpening of the cutting element is required. There is considerable advantage in dividing the blade into sections in that if only one tooth, or a group of adjacent teeth, is damaged only that part of the blade containing the damaged teeth need be removed for purposes of repair or replacement.

An embodiment of the invention incorporating this improved feature is illustrated in Figure 6 of the drawing. The cutter is indicated generally by reference character 14a and includes a cylindrical body 56a formed with a helical shoulder, band or ridge 57a. The cutting blade comprises small gauge, relatively short metallic sections 66, 67, 68, 69, 71 and 72, each shaped to conform to and to overlie a section of the helical shoulder 57a. The blade sections are so formed that the adjacent edges of adjoining sections will abut closely. The leading edge of each section is serrated to form teeth 73 and one edge of each serration or tooth is tapered to a cutting blade in the same manner as the continuous blade 58 in the first embodiment of Figure 3. Each section is retained rigidly in position on the helical shoulder or ridge 57a by a centrally located screw 74, the abutting contact of the ends of the sections preventing relative turning or twisting.

In the operation of a conventional compost machine of the type shown in Figure 1 utilizing a rotary cutter constructed in accordance with the present invention, the hay is placed lengthwise on conveyor belt 43 of feed unit 16; that is, it is arranged longitudinally and in the direction of belt movement. The lower portion of rotating stabilizer cylinder 49 cooperates with the supporting surface of belt 43 to compress the hay and move it across transverse apron 44 and toward rotating cutter 14.

The sharpened serrations of blade 58 of rotary cutter 14 moving downwardly and closely adjacent the edge of transverse apron 44 cut the hay fibers at a distance from their ends which abut the surface of the cutter cylinder 56. The hay is reduced to cuttings of a length equal to the distance between the surface of cylinder 56 and the adjacent edge of transverse apron 44. In its preferred form the speed of rotation of cutter 14 or 14a is so related to the rate of material feed accomplished by the conveyor unit 16 that an advancing cutting serration or tooth performs its cutting function immediately after a fiber or blade has advanced into contact with the cutter cylindrical body. Power from the single driving motor 18 is delivered through the power transmission system described to all moving components of the machine including the novel cutter, the feeding unit, and the stabilizing unit.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a rotary cutter of the class described, a cylindrical body having a flat helical ridge on its cylindrical surface, a band-type helical steel blade seated closely on said ridge, said blade being formed with a plurality of serrations along one of its edges, each of said serrations having one of its sides parallel to the axis of rotation of said body, the said parallel side of each of said serrations being sharpened, the said serrations extending forwardly from the edge of said supporting helical ridge, means to retain said blade on said ridge, and a shaft coincident with said cylindrical body axis adapted to support said cutter rotatably in a compost machine.

2. In a rotary cutter of the class described a cylindrical body having a flat surfaced helical shoulder formed on its surfaces symmetrically about its axis, a helical cutting blade of resilient material conforming normally to a slightly tighter helix than the surface of said ridge, said blade being adapted to be sprung slightly outward manually and slipped over said helical ridge to grip said ridge and to abut its surface firmly, said blade being formed with a plurality of regularly spaced serrations along one of its edges each of which has one of its sides extended parallel to the longitudinal axis of said cylinder, the said parallel side of each of said serrations being sharpened and positioned circumferentially forward of the leading edge of said supporting helical ridge with said body rotating in one direction about said axis, said helical blade being formed with holes at its opposite ends, screws extended through said holes and seated threadedly in said body ridge to retain said blade on said ridge, and a shaft coincident with said cylinder axis adapted to support said cylinder for rotation.

3. In a compost machine a rotary cutter comprising a cylindrical body having a flat surfaced helical ridge on its surface, a blade of elastic metal formed in a slightly tighter helix than the surface of said ridge, but generally conforming thereto, said blade being sprung slightly outward manually and slipped over said helical ridge to grip said ridge and abut the surface thereof firmly upon being released, said blade being formed with a plurality of regularly spaced serrations along one of its edges each of which has a sharpened side extended parallel to the longitudinal axis of said cylinder, the said serrations projecting circumferentially forwardly of the leading edge of said supporting helical ridge, said helical blade being formed with a hole at each of its opposite ends, screws extended through said holes and threadedly seated in said body ridge to retain said blade in place on said ridge, a shaft fixed to said cylindrical body for rotation therewith and extended in its longitudinal axis, means including brackets rotatably mounting said cutter transversely in a composting machine for rotation about said axis, driving means to rotate said shaft in said composting machine, a conveyor belt including a hay-supporting surface positioned for movement directly towards said rotating cutter to impinge the forward ends of hay and straw fibers arranged longitudinally thereon against the surface of said cutter cylinder to enable said sharpened serrated edge of said blade to cut said hay and straw fibers at a distance from their impinging ends equal to the height of said helical blade from the surface of the cylinder.

4. In a compost machine, a rotary cutter of the class described including a cylindrical body having a flat surfaced helical ridge formed on its surface symmetrically about its axis, a plurality of metallic plates mounted on said ridge to form a continuous metallic blade, said plates being formed to abut closely the underlying supporting surface of said ridge, the adjacent edges of adjoining plates being shaped to abut, each of said plates being formed centrally with a hole, a screw inserted in each of said holes and seated threadedly in said helical ridge to retain an underlying plate in place on said ridge, each of said plates being formed with regularly spaced serrations along one of its sides, each of said serrations having a sharpened side parallel to the axis of rotation of said body and positioned circumferentially in advance of the leading edge of said supporting helical ridge, a supporting shaft coincident with the longitudinal axis of said body, a frame including brackets rotatably supporting said cylindrical body, means to rotate said shaft and rotary cutter, a fixed apron adjacent said body, a conveyor unit to advance hay arranged longitudinally across said apron and into abutting contact with said cylindrical body to enable the sharpened edges of said serrations to cut said hay adjacent the edge of said apron and at a distance from said body.

5. In a rotary cutter of the class described, a cylindrical body, a band-type helical blade encircling said body and formed with a plurality of serrations along one of its edges, each of said serrations having one of its sides parallel to the longitudinal axis of said body, said one side being sharpened to form a cutting edge, an intermediate supporting element between said blade and said body fixedly and removably supporting said blade on said body with the body of said blade lying in a cylinder concentric to said body and with each of said sides of said serrations which extend parallel to said longitudinal axis at a predetermined radial distance therefrom equal to the length of cutting which said cutter is adapted to cut from a fiber or blade of grass or hay fed continuously against said body upon the rotation of said cutter in a compost machine, and means to support said cylindrical body for rotation about its cylindrical axis.

PRICE W. PERRY.

References Cited in the file of this patent

UNITED STATES PATENTS

| Number | Name | Date |
|--------|------|------|
| 25,789 | Lash | Oct. 11, 1859 |

FOREIGN PATENTS

| Number | Country | Date |
|--------|---------|------|
| 552,188 | France | May 27, 1922 |